M. W. ATWOOD.
CENTER BOARD FOR BOATS.
No. 10,105. Reissued May 9, 1882.
Fig. 1
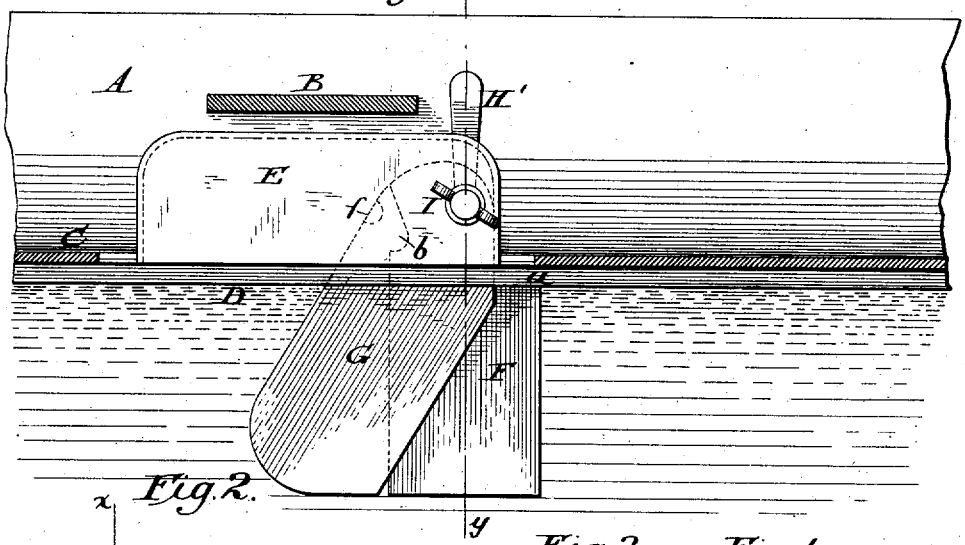
Fig. 2.
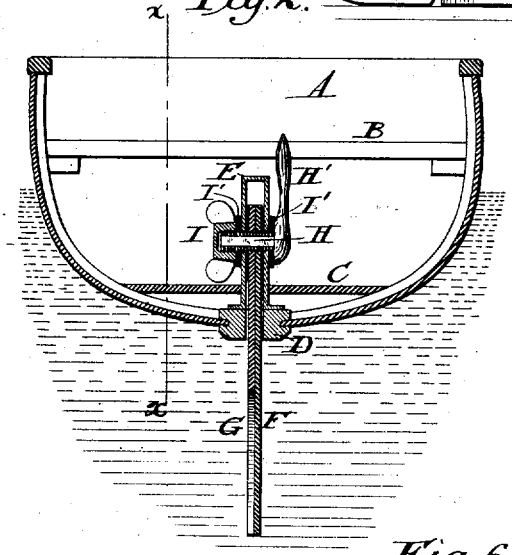
Fig. 3
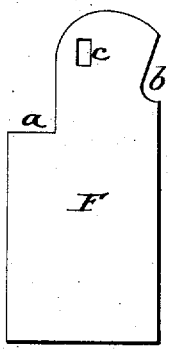
Fig. 4.
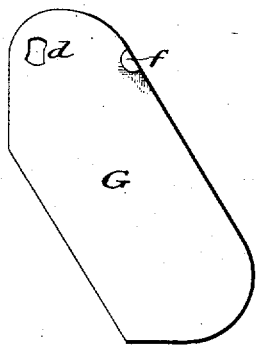
Fig. 6
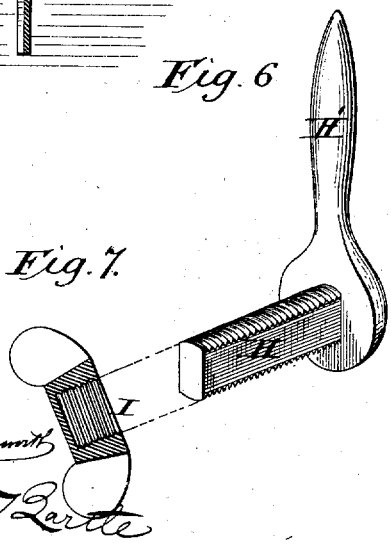
Fig. 5
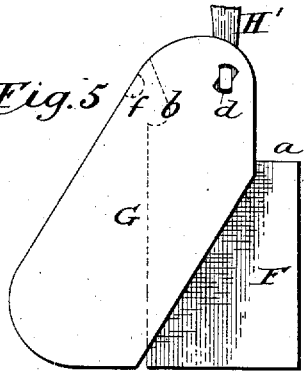
Fig. 7.
Attest.
Sidney P. Hollingsworth
Howell T. Lartle
Inventor.
M. W. Atwood
By his Atty
Philip T. Dodge
N. PETERS, Photo-Lithographer, Washington, D. C.

UNITED STATES PATENT OFFICE.

MONTRAVILLE W. ATWOOD, OF CLAYTON, NEW YORK.

CENTER-BOARD FOR BOATS.

SPECIFICATION forming part of Reissued Letters Patent No. 10,105, dated May 9, 1882.

Original No. 230,989, dated August 10, 1880. Application for reissue filed March 8, 1882.

*To all whom it may concern:*

Be it known that I, MONTRAVILLE W. ATWOOD, of Clayton, in the county of Jefferson and State of New York, have invented certain new and useful Improvements in Center-Boards for Boats; and I do hereby declare the following is a full, clear, and exact description of the invention, that will enable others skilled in the art to which it appertains to make and use the same, reference being had to the accompanying drawings, and to the letters of reference marked thereon, which form a part of this specification.

The object of my invention is to provide an efficient center-board which may be closed into a compact form within a box or well without the necessity of extending the latter to such height as to form a serious impediment to the boat.

In carrying out my invention I provide a boat with a low well or casing, closed at all points except the bottom, where it communicates with an opening through the keel of the boat. Within the well I pivot one end of the center-board, extending the pivot or hinge-pin through the side of the well and applying a handle or lever to the outer end in such manner that by moving the lever the pivot will be caused to raise and lower the center board. For the purpose of preventing leakage around the pivot, washers are applied, and for the purpose of holding the center-board in the position required the hinge-pin is threaded and provided with a nut, by tightening which sufficient friction or pressure may be applied to retain the board in position. In order to admit of the board being folded into a compact form, it is made in sections mounted on one and the same pivot, the sections being constructed in the manner hereinafter described, so that by the operation of the hinge-pin or pivot they are caused to swing past each other and extended in position for use, or folded side by side within the well.

Referring to the accompanying drawings, Figure 1 represents a longitudinal vertical section through the waist or middle portion of the boat on the line *x x*, Fig. 2. Fig. 2 represents a transverse vertical section of the boat on the line *y y*, Fig. 1. Figs. 3 and 4 are side views of the two sections or blades of the center-board disconnected. Fig. 5 is a side view, illustrating the two sections in their proper relative positions in connection with the hinge-pin. Fig. 6 is a perspective view of the hinge-pin or pivot. Fig. 7 is a sectional view of the nut used in connection therewith.

Referring to the drawings, in which like letters indicate like parts, A represents the hull of a boat; B, the transverse thwart or seat; C, the flooring; D, the keel, all of which parts are of the ordinary construction.

E represents the box or casing, commonly known in the art as a "well." This well is located centrally beneath the thwart upon the keel, over a vertical longitudinal opening in the latter. The well is closed on all sides except the bottom, and is made water-tight at all points within the boat.

The center-board consists of the two flat boards or metal plates F and G, arranged to swing side by side vertically through the keel into and out of the well, both sections being mounted at their forward ends upon a transverse hinge-pin or bolt, H, passing through them, and also through both sides of the well. The pivot H is flattened on its sides and the center-board sections F provided with a slot, *c*, of corresponding form, so that by turning the pivot it will be caused to lower the blade F. For the purpose of thus turning the pivot to operate the board a hand-lever, H′, is secured to or formed upon the end of the pivot outside of the well, as clearly represented in Figs. 1, 2, and 3. The second section, G, of the center-board is provided with a slot or opening, *d*, to receive the pivot-pin, this slot being widened at its two ends, or, in other words, made of a fan shape at each end in order to permit the flattened pivot to turn to a limited extent therein. Upon turning the handle and pivot backward the two blades are lowered from the well and extended beneath the boat, as represented in Figs. 1 and 2, the form of the slots permitting the blade F to swing forward past and in advance of the blade G. On turning the lever and pivot in the opposite direction the blade F is first moved backward until it is in line with the blade G, at which time the flattened pivot, locking fast in the slot *d*, causes the blade G to swing upward with the blade F, the two being carried together side by side into the well. As a further means of causing the two blades to swing together, the blade G is provided on one side with a small stud or stop, *f*, and the rear edge of the blade F provided with a notch or recess, *b*, to receive said stop. In operation the blade F swings upward until its rear edge encounters the stop *f* on the plate G, whereupon the two blades are compelled to rise together.

In order to prevent leakage through the sides of the well around the pivot, I apply washers I′ to the ends of the bolt outside of the well, as shown. As a means of applying the necessary compression to these washers to prevent leakage, and also of causing sufficient friction between the parts to keep the blades in any position in which they may be placed, the pivot-pin is threaded externally and provided on one end, outside of the well, with a screw-cap, I, by turning which the washers, the sides of the well, and the two blades of the center-board may be crowded together.

It will be observed that under the above construction and arrangement of parts the pivot-pin serves the twofold purpose of sustaining the center-board sections, and of raising and lowering the same. It will also be observed that the arrangement is such that the parts are all embraced within a comparatively small compass near the bottom of the boat, so that they do not form objectionable obstructions therein.

In the drawings I have represented the blade or center-board (section F) provided with a square shoulder, *a*, which serves as a stop to limit the forward motion of the center-board and retain the same in a perpendicular operative position. I have also represented the blade G with a rounded edge and with a front edge cut away on an oblique line, *i*, to encounter the front side of the well, and thereby hold the section G backward when in action behind the front section, F.

Having thus described my invention, what I claim is—

1. In combination with a vertically-swinging center-board, a hinge-pin sustaining the same, and provided with a handle or operating device, substantially as shown, whereby the board may be swung upward and downward.

2. The vertically-swinging center-board, mounted upon and turning with a transverse pivot or hinge-pin, arranged, as described, to be raised and lowered by the rotation of said pin.

3. In a boat, the combination of the closed well, the vertically-swinging center-board mounted therein, the transverse pivot arranged to sustain and rotate with said board, and an operating device applied to the end of said pivot outside of the well, substantially as described and shown.

4. In combination with the well, the vertically-swinging center-board, the transverse pivot arranged, as described, to turn the center-board upward and downward, and the tightening devices applied to the transverse pivot, substantially as shown and described, whereby lateral pressure may be applied to retain the center-board in position.

5. In combination with the well and the flattened pivot-pin, provided with an operating-handle extending through and beyond the same, the center-board sections, one provided with the rectangular slot and the other with a slot having widened ends.

6. The combination of the well, the vertically-swinging center-board, the flattened threaded pivot-bolt extended through the well and the center-board, the hand-lever, the washers, and the tightening-nut applied to said bolt, as shown.

7. In combination with the well, the two center-board sections mounted upon a common pivot within the well, and having their forward ends constructed, as described and shown, to co-operate with the front of the well and form stops to sustain the sections in their proper relative positions for action, as set forth and shown.

In testimony whereof I affix my signature in presence of two witnesses.

MONTRAVILLE W. ATWOOD.

Witnesses:

W. C. DUVALL,

PHILIP T. DODGE.